Jan. 10, 1939.                A. E. OSBORN                2,143,279
                               PIPE JOINT
                         Filed April 2, 1937            2 Sheets—Sheet 1
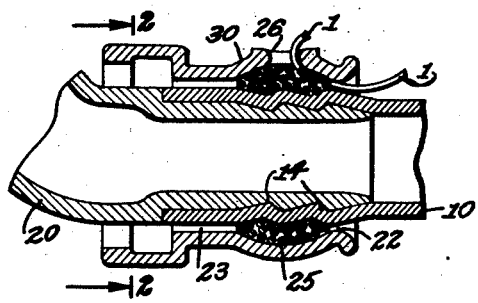
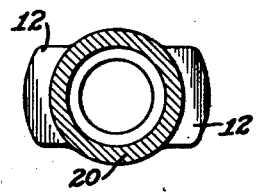
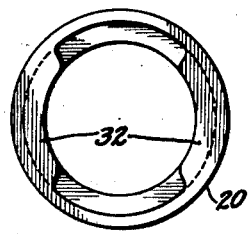
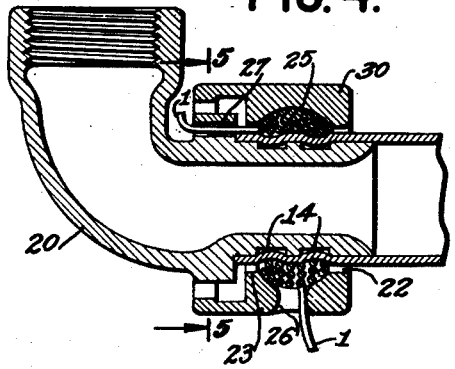
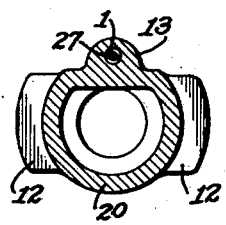
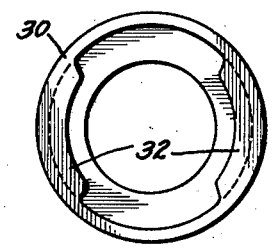
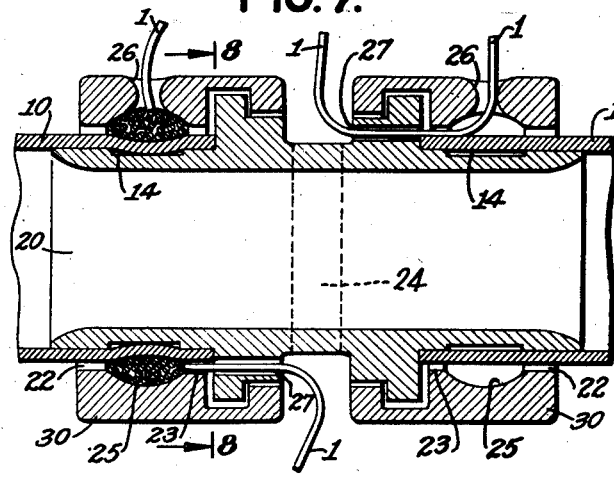
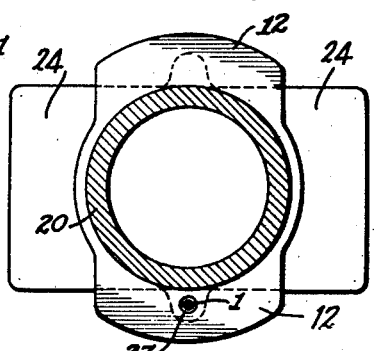
INVENTOR
Alden E. Osborn.

Jan. 10, 1939.  A. E. OSBORN  2,143,279

PIPE JOINT

Filed April 2, 1937  2 Sheets-Sheet 2

INVENTOR
Alden E. Osborn.

Patented Jan. 10, 1939

2,143,279

UNITED STATES PATENT OFFICE 2,143,279

PIPE JOINT

Alden E. Osborn, New York, N. Y.

Application April 2, 1937, Serial No. 134,488

5 Claims. (Cl. 285—84)

My invention relates to a pipe joint or means for attaching fittings or couplings to pipe or other objects, which not only firmly retains the parts to be connected in position, but also forms a leak-proof joint capable of withstanding considerable pressure. This joining means is very inexpensive, as threads, bolts, etc., are eliminated, and can be adapted to a large variety of conditions and uses without departure from the spirit and scope of the invention as defined in the appended claims.

In the accompanying drawings—

Figure 1 represents a longitudinal sectional view of my invention applied between a pipe and fitting.

Figure 2 represents a cross sectional view of the fitting of Figure 1 on the line 2—2.

Figure 3 represents an end view of the nut or outer collar member of the pipe joining means of Figure 1.

Figure 4 represents a longitudinal sectional view of a modification of my invention as shown in Figures 1, 2 and 3.

Figure 5 represents a cross sectional view of the fitting of Figure 4 on the line 5—5.

Figure 6 represents an end view of the nut or collar of the pipe joining means of Figure 4.

Figure 7 represents a longitudinal sectional view of a coupling embodying my invention.

Figure 8 represents a cross sectional view of the fitting or internal member of Figure 7 on the line 8—8.

Figure 9:
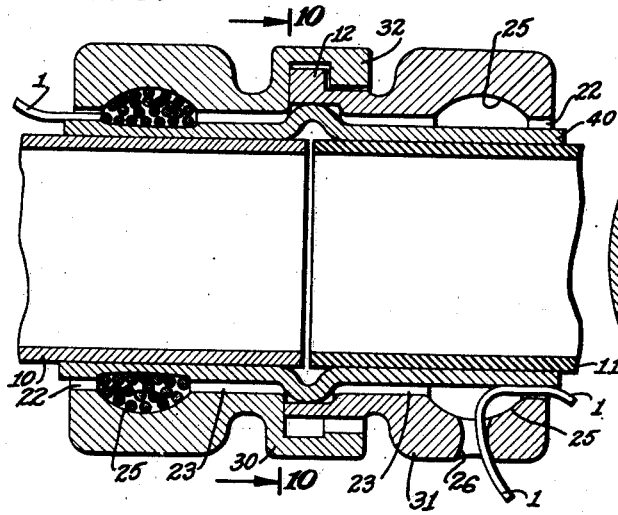
Figure 9 represents a longitudinal sectional view of a modification of the coupling shown in Figures 7 and 8.

In Figure 1 my invention is shown arranged to fasten, with a leak-proof joint, the pipe or tube 10 to the fitting 20. This fitting 20 is provided with a cylindrical end that can be introduced into the pipe 10 and this end, which extends into the pipe, is preferably grooved on its exterior at 14 so that, when the parts are finally assembled, the pipe will be pressed into the groove or grooves and thus be more firmly held in position. The fitting 20 is also provided, adjacent to the end over which the pipe extends, with lugs 12 which are shown on opposite sides thereof and are adapted to engage with lugs 32 on the nut or collar 30 when the nut is in place and rotated to its normal position while the lugs 12 will pass between the lugs 32 when the nut is rotated and is being put in place. These lugs 12 and 32 on the fitting and nut are particularly shown in Figures 2 and 3. The nut 30 is provided with a channel 25 and an opening 26 intersecting the channel and fits about the pipe 10 with a clearance at 22 and 23 or clearance at only one of these points, if preferred. There is also provided, in order to complete my invention, a wire or cord 1 which is preferably of metal or any other relatively hard and strong material.

The method of assembling this joint is as follows: An end of the wire 1 is passed thru the aperture 26 of the nut 30 and out of the nut through the clearance at 22 as shown or, if preferred, through the clearance at 23. The nut is thereafter put on the pipe 10 and the pipe is slipped into position over the fitting 20 and the nut is then moved into place so that the lugs 32 are inside the lugs 12. The nut 30 is thereafter rotated while the end of the wire 1 that extends beyond the clearance is held from movement relative to the pipe and fitting with the result that the part of the wire 1 that extends outside of the aperture 26 will be pulled through the aperture and wound about the pipe 10 until the channel 25 is filled to the extent desired to compress the pipe against the fitting and retain it in position. It will be obvious that, as the nut 30 could be finally turned so that the lugs 12 and 32 would be in line and thus would be immovable longitudinally in relation to the fitting 20, the pipe 10 would be held from movement both by engagement with the fitting and by the wire 1 between its exterior and the nut so that the pipe would be fastened very securely and particularly so if it is pressed into the grooves 14 of the fitting. The tightness of the joint against leakage is insured by the compression of the pipe against the exterior of the fitting and especially by its engagement with the grooves 14. This pipe joining means has the advantage, for some applications, over the pipe joints shown in my Patents No. 2,101,155, dated Dec 7, 1937; No. 2,102,434 dated Dec. 14, 1937, and No. 2,104,351, dated Jan. 4, 1938, in that it is not necessary to turn either the pipe 10 or the fitting 20 during the assembling and tightening of the joint, as in certain cases the pipe may be either long or curved or other conditions may exist that make its rotation or the rotation of the fitting very difficult.

Owing to the fact that the wire 1 can be of a strong material it is easily possible to obtain a very high pressure on the exterior of the pipe 10 before the strain of pulling the wire thru the aperture is sufficient to cause it to break and, in some cases, an actual groove would be formed in the pipe thus holding the pipe still more securely. Moreover, owing to the small angle that the sides of the channel make with relation to the outer surface of the pipe, the wire tends to wedge between the channel surface and the pipe and so further prevent pipe movement. It will be noticed that the object of the clearance at 22 or 23 in the interior of the nut or collar 30 is to enable the end of the wire 1 to pass outside of the nut adjacent to the pipe 10 so that the end can be held from movement in relation to the pipe when turning the nut during the process of winding the wire into the channel, and that this feature is in accordance with and serves the same purpose as the construction described and claimed in my patent for a Protector, No. 1,949,431 of March 6, 1934 and will not be further dealt with herein. While this invention is particularly adapted to join metallic pipes to fittings, it is obvious that the pipe may be of other materials, or a rubber hose or other flexible conduit. It is a particularly desirable joining means for hose subject to high pressure or likely to be pulled about, as both the inside and outside of the hose pipe would be gripped and the fitting could not be pulled out unless exceedingly great strains were put on it.

The modification shown in Figures 4, 5 and 6 provides a special means for holding the end of the wire 1 from movement in relation to the pipe 10, when the wire is being wound into the channel 25, that consists of provding the fitting 20 with a passage or hole 27 thru which the end of the wire 1 can be passed so that it is held from movement by the fitting. The wire end outside this passage 27 can be bent, knotted, or otherwise held from pulling back thru the passage. The passage 27 is, as shown in Figure 5, made thru a special lug 13 between the two lugs 12 that engage the inwardly projecting lugs 32 on the nut 30. An end view of the nut is shown in Figure 6.

In Figures 7 and 8 is shown a slight modification of the joint illustrated in Figures 4, 5 and 6 applied to a coupling for joining pipe. In these figures my pipe joints are at each end of the coupling 20 and one of them is shown as having the wire 1 wound in place while the other is shown with the wire 1 passed thru the aperture 26 and the clearance at 23 and the passage 27 but not yet wound about the pipe. When winding the wire 1 into the channel, the fitting 20 is held by the flange 24, which is preferably formed with a rectangular, hexagonal or notched outer edge, while the nut is turned and thus the wire is held from movement in relation to the pipe. A form of this flange 24 for holding the fitting is illustrated in Figure 8.

Figure 10:
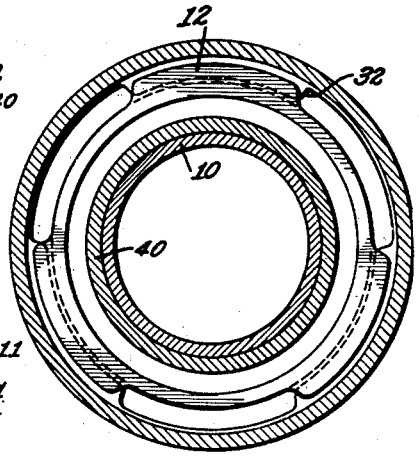
Figure 10 represents a cross sectional view of Figure 9 on the line 10—10.

A modification of this coupling design is illustrated in Figures 9 and 10 in which, instead of the fitting 20 of the previously described forms extending within the pipes 10 and 11, a sleeve 40 is provided and fits over the exterior of the pipes adjacent their point of junction. This sleeve is compressed against the pipes when the wire 1 is wound into the channels 25 in the nuts or collars 30 and 31 and, owing to the fact that it would preferably be made of a flexible or plastic material in order to form a tight joint on the outside of the pipe, it would not be desirable to depend on this sleeve to withstand much pressure tending to force the pipes apart and, for this reason, I have provided that the nuts or collars interlock together when rotated to their final position. This is accomplished by providing external lugs 12 on one of the nuts while internal lugs 32 are arranged on the other nut. While, as shown in Figure 10, three lugs are provided on each of the parts to be interlocked and while two lugs are shown on each of the interlocking parts in some of the other figures illustrating my invention, any desired number of these lugs can be used.

In this form of my invention the wire 1, which serves to compress the sleeve 40 against the pipes 10 and 11, may in some cases exert sufficient pressure against the outside of the sleeve and on the pipe to form a groove in the pipe and thus, because also of the two nuts being interlocked, hold the pipes together very firmly.

Figure 11:
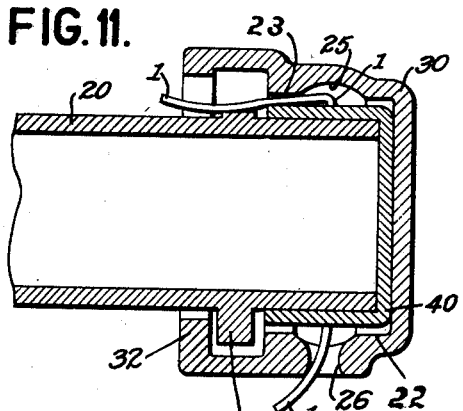
Figure 11 represents a longitudinal sectional view of a modification of my invention as shown in Figures 9 and 10 to adapt it to fasten covers in position.

In Figure 11 is shown a modification of the form of my invention illustrated in Figures 9 and 10 and this modification is used in a different way, as the fitting 20 may be the rim of an inspection opening of a tank or boiler or the end of a bottle, barrel, drum or container around the opening thereof, while the nut or collar 30 is shown as closed at its end so that it forms a cover. The sleeve 40, around which the wire 1 is wound, is also shown as closed at the end and is of a plastic or flexible material so that the wound-in wire can press it tightly against the outer surface of the end of the fitting. It will be noticed that in this form of my invention, as well as in the forms shown in Figures 12 and 13, both the fitting 20 and part 30 to be joined thereto are of a special form having lugs. In Figure 11 the lugs 12 on the fitting 20 are adjacent to the cylindrical end on which the sleeve 40 fits while the lugs 32 are at the inner end of the collar or cover 30. These lugs take any pressure tending to force the fitting and cover apart so that the wire 1 functions only as a means for making the joint leak-proof by pressing the sleeve against the fitting.

Figure 12:
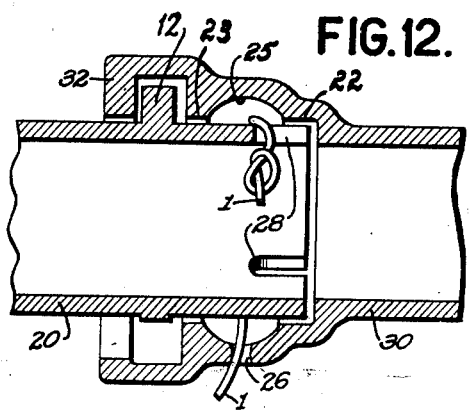
Figure 12 represents a longitudinal sectional view of a still further modified form of my invention.

In Figure 12 is shown a slight modification of Figure 11 in that the sleeve 40 of Figure 11 is eliminated and the wire 1 is wound directly between the members 20 and 30. In this figure, both members are shown as being pipe or tubing with especially formed ends embodying my joining means.

Figure 13:
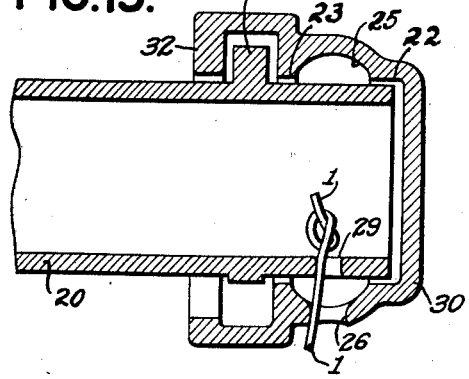
Figure 13 represents a longitudinal sectional view of the form of my invention shown in Figure 12 as modified to adapt it to fasten covers in place.
Figure 14:
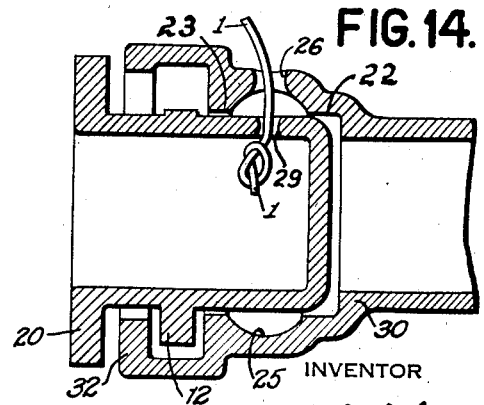
Figure 14 represents a longitudinal sectional view of a modification of Figure 13.

Figure 13 shows practically this same form of my invention applied as a cover fastening for the same uses as the form of my invention shown in Figure 11. In Figure 14 the parts are arranged so that the cover is the inside member. Otherwise, the device of this figure is the same as that of Figure 13. The wire 1 in these Figures 12, 13 and 14 serves mainly as a packing to prevent leakage as the pressure tending to separate the parts 20 and 30 is taken by the lugs 12 and 32.

In these Figures 12, 13 and 14, the end of the wire that is held from movement in relation to the inner member can be passed thru the clearance and held from outside of the collar or outer member as illustrated in Figures 9 and 11, although it is shown in Figure 12 as being held by engaging a notch 28 in the end of the pipe 20.

while in Figures 13 and 14 it is shown as passed thru a hole 29 in the inner member.

It should be understood that the element referred to as wire can be of any material and section and can be stranded or composed of a number of separate wires twisted or interwoven together to form a cord or tape, or it may be a single homogeneous wire of any material, size and section that can be readily bent in passing thru the aperture and winding about the pipe or internal member. It is desirable to use a wire of very hard and strong material with the forms of my invention shown in Figures 1 to 11 in order that a high pressure ran be developed in the joint before the wire breaks and to use a wire of a soft or plastic material or a cord or rope of any material suitable for packing with the forms of my invention shown in Figures 12 to 14 as in these forms the wire, as stated above, serves mainly to make the joint tight against leakage.

I claim:

1. In a joint between inner and outer coaxial members, the outer member being rotatably mounted on the inner member and having a portion thereof spaced to receive therein flexible securing means arranged to be drawn into said space by relative rotation between said members, means to prevent relative longitudinal displacement or separation of said members under internal pressure conditions, said means comprising coacting parts on the inner and outer members arranged to hold said members against longitudinal displacement or separation when said parts are disposed in overlapping relation and to hold said members in substantial coaxial alinement.

2. In a joint between inner and outer coaxial members, the outer member being rotatably mounted on the inner member and having a portion thereof spaced to receive therein flexible securing means arranged to be drawn into said space by relative rotation between said members, means to prevent relative longitudinal displacement or separation of said members under internal pressure conditions, said means comprising coacting parts on the inner and outer members arranged to hold said members against longitudinal displacement or separation when said parts are disposed in overlapping relation and to hold said members in substantial coaxial alinement, said coacting parts comprising a plurality of circumferentially spaced, alined parts carried by and extending outwardly from the inner member, and a plurality of spaced, alined parts extending inwardly from the outer member.

3. In a joint between inner and outer coaxial members, the outer member being rotatably mounted on the inner member and having a portion thereof spaced to receive therein flexible securing means arranged to be drawn into said space by relative rotation between said members, means to prevent relative longitudinal displacement or separation of said members under internal pressure conditions, said means comprising coacting parts on the inner and outer members arranged to hold said members against longitudinal displacement or separation when said parts are disposed in overlapping relation and to hold said members in substantial coaxial alinement, said coacting parts on the inner and outer members being so relatively arranged as to permit the parts on one member to move between the parts on the other member when the members are in one position of angular rotation relative to each other and to prevent relative longitudinal movement tending to separate the members when said members are in another position of relative angular rotation.

4. In a joint between inner and outer coaxial members, the outer member being rotatably mounted on the inner member and having a portion thereof spaced to receive therein flexible securing means arranged to be drawn into said space by relative rotation between said members, means to prevent relative longitudinal displacement or separation of said members under internal pressure conditions, said means comprising coacting parts on the inner and outer members arranged to hold said members against longitudinal displacement or separation when said parts are disposed in overlapping relation and to hold said members in substantial coaxial alinement, said coacting parts comprising a plurality of outwardly extending spaced lugs carried by and disposed in a plane substantially at right angles to the axis of the inner member, and a plurality of inwardly extending spaced lugs carried by and disposed in a plane disposed substantially at right angles to the axis of the outer member.

5. In a joint between inner and outer coaxial members, the outer member being rotatably mounted on the inner member and having a portion thereof spaced to receive therein flexible securing means arranged to be drawn into said space by relative rotation between said members, means to prevent relative longitudinal displacement or separation of said members under internal pressure conditions, said means comprising coacting parts on the inner and outer members arranged to hold said members against longitudinal displacement or separation when said parts are disposed in overlapping relation and to hold said members in substantial coaxial alinement, said coacting parts comprising a plurality of outwardly extending spaced lugs carried by and disposed in a plane substantially at right angles to the axis of the inner member, and a plurality of inwardly extending spaced lugs carried by and disposed in a plane disposed substantially at right angles to the axis of the outer member, said coacting parts on the inner and outer members being so relatively arranged as to permit the parts on one member to move between the parts on the other member when the members are in one position of angular rotation relative to each other and to prevent relative longitudinal movement tending to separate the members when said members are in another position of relative angular rotation.

ALDEN E. OSBORN.